United States Patent
Reusche et al.

(10) Patent No.: US 7,241,974 B2
(45) Date of Patent: Jul. 10, 2007

(54) SYSTEM AND METHOD OF DEACTIVATING A FLUID RECEPTACLE DEICER

(75) Inventors: Thomas K. Reusche, Elburn, IL (US); Philip E. Chumbley, Aurora, IL (US)

(73) Assignee: Allied Precision Industries, Inc., Elburn, IL (US)

( * ) Notice: Subject to any disclaimer, the term of this patent is extended or adjusted under 35 U.S.C. 154(b) by 65 days.

(21) Appl. No.: 11/318,746

(22) Filed: Dec. 27, 2005

(65) Prior Publication Data

US 2006/0096971 A1    May 11, 2006

Related U.S. Application Data

(63) Continuation-in-part of application No. 10/984,076, filed on Nov. 8, 2004.

(60) Provisional application No. 60/641,393, filed on Jan. 4, 2005.

(51) Int. Cl.
*F27D 11/00* (2006.01)

(52) U.S. Cl. ..................................... 219/203; 219/497

(58) Field of Classification Search ................ 219/203, 219/497, 499; 392/497, 499; 119/73
See application file for complete search history.

(56) References Cited

U.S. PATENT DOCUMENTS

| | | | | |
|---|---|---|---|---|
| 3,496,339 | A * | 2/1970 | Portas et al. | 219/501 |
| 4,835,366 | A * | 5/1989 | Owen et al. | 392/499 |
| 6,080,973 | A * | 6/2000 | Thweatt, Jr. | 219/497 |
| 6,415,104 | B1 * | 7/2002 | Fitts et al. | 392/503 |
| 6,633,727 | B2 * | 10/2003 | Henrie et al. | 392/498 |
| 6,744,978 | B2 * | 6/2004 | Tweedy et al. | 392/451 |
| 2005/0045621 | A1 * | 3/2005 | Chenier et al. | 219/490 |

* cited by examiner

*Primary Examiner*—Philip H. Leung
*Assistant Examiner*—Vinod Patel
(74) *Attorney, Agent, or Firm*—McAndrews, Held & Malloy, Ltd.

(57) ABSTRACT

A deicing system configured to heat fluid within a fluid receptacle to prevent ice from forming includes a sensing unit and a heating element. The sensing unit is configured to detect a change in at least one of capacitance and resistivity. The heating element is configured to heat the fluid. The sensing unit operates to deactivate the heating element when the sensing unit detects the change in at least one of capacitance and resistivity.

8 Claims, 3 Drawing Sheets

SYSTEM AND METHOD OF DEACTIVATING A FLUID RECEPTACLE DEICER

RELATED APPLICATIONS

The present application is a continuation-in-part of U.S. application Ser. No. 10/984,076, entitled "Liquid Level Sensor," filed Nov. 8, 2004, which is hereby incorporated by reference in its entirety. The present application also relates to and claims priority from U.S. Provisional Application No. 60/641,393, entitled "Remote Heater Shutoff," filed on Jan. 4, 2005, which is also hereby incorporated by reference in its entirety.

BACKGROUND OF THE INVENTION

Embodiments of the present invention generally relate to a deicing system configured for use with a fluid receptacle, such as a livestock water tank, and more particularly, to a deicing system that operates to deactivate a heating element by detecting changes in capacitance and/or resistivity.

Heating or deicing systems have been used to maintain unfrozen areas in water tanks for livestock, fish ponds, and the like. A typical deicing system includes a heater coil that may operate at a high output, such as 1500 Watts. The heat from the coil is transferred to water contained within the tank to keep it from freezing. Many tanks employed for this purpose are metallic, plastic, or other such materials.

If the heater coil continues to operate when the water level in the tank recedes to a point in which the heater coil directly contacts a surface of the tank, the temperature of the heater coil may heat the surface of the tank to a point in which it is dangerous to touch. In fact, the heater coil may cause the surface of some tanks to melt, or ignite.

Typically, thermostats are connected to the heater coil via a thermal path, and operate to deactivate the heater coil if the heater coil gets too hot, as it would if the water level in the tank drops such that the heater coil is exposed to air. If the thermostat is faulty, or only a portion of the heater coil is exposed to air, the heater coil may become extremely hot and present a potential fire hazard. For example, if a portion of the heater coil is exposed to air, but the portion connected to the thermostat is submerged in liquid, the thermostat may not detect the increased temperature of the portion exposed to the air. The exposed portion may contact the surface of the tank and pose the hazards mentioned above.

Thus, a need exists for a safer and more reliable system and method of operating and deactivating a deicing system within a fluid receptacle.

SUMMARY OF THE INVENTION

Certain embodiments of the present invention provide a deicing system configured to heat fluid within a fluid receptacle to prevent ice from forming. The system includes a sensing unit and a heating element. The sensing unit is configured to detect a change in capacitance and/or resistivity. The heating element is configured to heat the fluid within the fluid receptacle. The sensing unit operates to deactivate the heating element when the sensing unit detects the change in capacitance and/or resistivity. The change in capacitance and/or resistivity is the change that results from at least a portion of the system being exposed to water and then to air.

Certain embodiments of the present invention also provide a method of deactivating a heating element of a deicing system positioned within a fluid receptacle. The method includes detecting a change in at least one of capacitance and resistivity, and deactivating the heating element based on the detecting step.

Certain embodiments of the present invention also provide a deicing system that includes a flotation member configured to provide buoyancy, a heating element, and a capacitor plate. The heating element has a first length and a first width defining a first outer perimeter. The capacitor plate may be secured to at least one of the flotation member and the heating element. The capacitor plate has a second length and a second width defining a second outer perimeter. The first outer perimeter of the heating element does not extend past a length-width envelope of the second outer perimeter of the capacitor plate.

Figure 1:
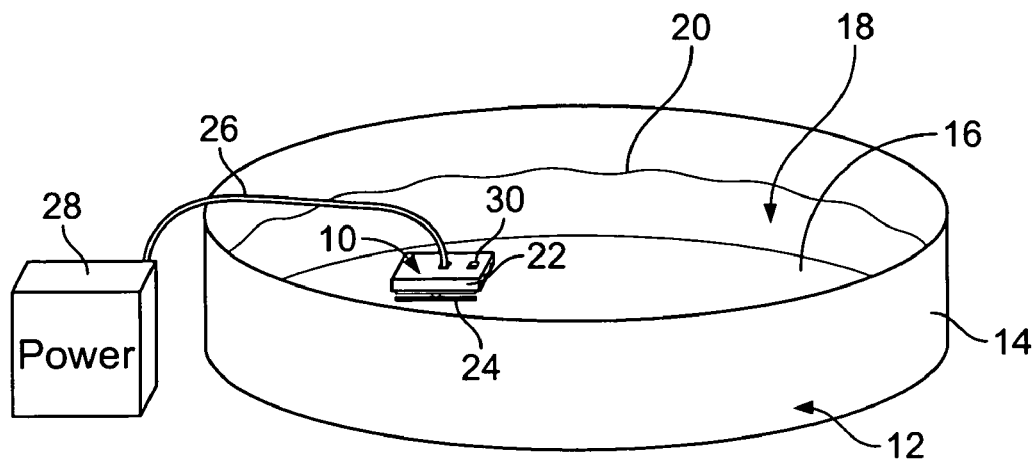
FIG. 1 illustrates an isometric simplified representation of a deicing system within a fluid receptacle according to an embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

FIG. 1 illustrates an isometric simplified representation of a deicing system 10 within a fluid receptacle 12 according to an embodiment of the present invention. The fluid receptacle 12 includes lateral walls 14 integrally formed with a base 16. A fluid retention cavity 18 is defined between the lateral walls 14 and the base 16. The fluid receptacle 12 may be a birdbath, a livestock water tank, or various other structures that are designed to retain fluid. Fluid, such as water 20, may be retained within the fluid receptacle 12.

The deicing system 10 may include a flotation member 22 connected to a heating element 24 (such as a heater coil), a capacitor plate (not shown in FIG. 1) and an insulated cord 26 that supplies power from a power source 28, such as a standard wall outlet, to the deicing system 10. The deicing system 10 may also include a sensing unit 30, such as a microchip having a central processing unit, which is programmed to control operation of the deicing system 10, in communication with the capacitor (as discussed below). Alternatively, the deicing system 10 may not include a flotation member 22. Optionally, the sensing unit 30 may be remotely located from the deicing system. Additionally, instead of the cord 26 and the power source 28, the deicing system 10 may be battery or solar powered.

The flotation member 22 may be an air-filled bladder, Styrofoam, rubber, or various other materials that provide buoyancy to the deicing system 10. The flotation member 22 ensures that the deicing system 10 floats within the fluid receptacle 12 when a sufficient amount of water 20 is retained therein.

The heating element 24 operates to heat the water 20 within the fluid receptacle 12 so that the water 20 does not freeze. As discussed below, when fluid recedes, evaporates, drains, or is otherwise removed from the fluid receptacle 12 such that fluid is no longer proximate the capacitor (not shown in FIG. 1), the sensing unit 30 acts to deactivate the heating element 24 so that the heating element 24 does not damage the fluid receptacle 12, or otherwise pose a safety hazard.

Figure 2:
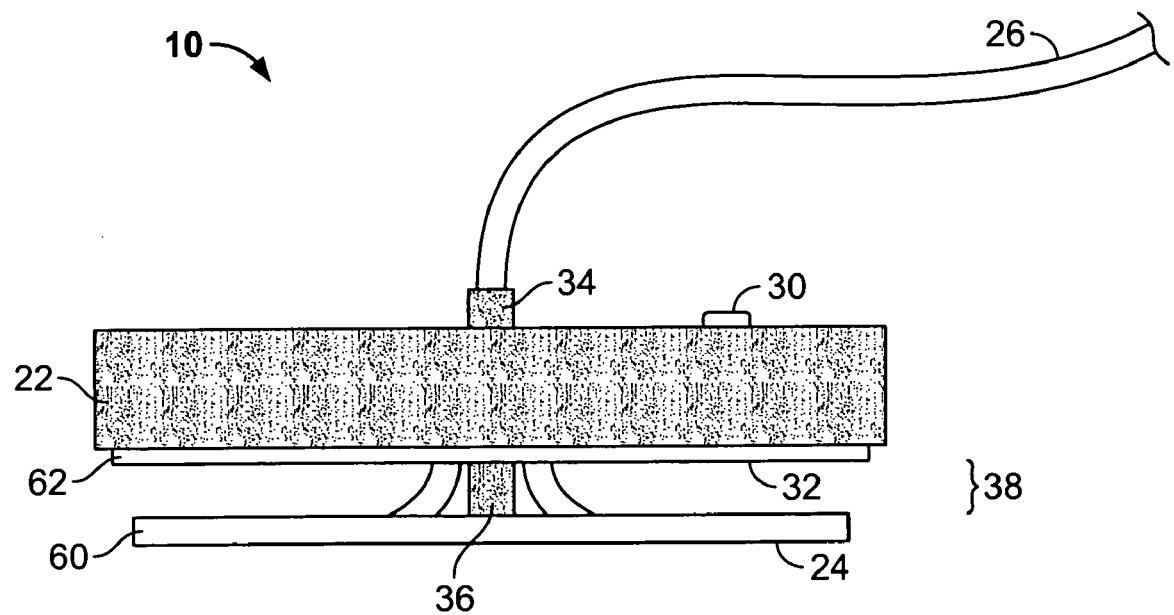
FIG. 2 illustrates a lateral view of a deicing system according to an embodiment of the present invention.

FIG. 2 illustrates a lateral view of the deicing system 10. As mentioned above, the deicing system 10 includes the flotation member 22, the capacitor plate 32, and the heating element 24. A conduit 34 passes through the flotation member 22 and allows power to be delivered from the cord 26 to the heating element 24. The sensing unit 30 is shown on top of the flotation member 22. However, the sensing unit 30 may be disposed within the flotation member 22, on or within the capacitor plate 32 or a separate support, or mounted to the heating element 24.

Figure 3:
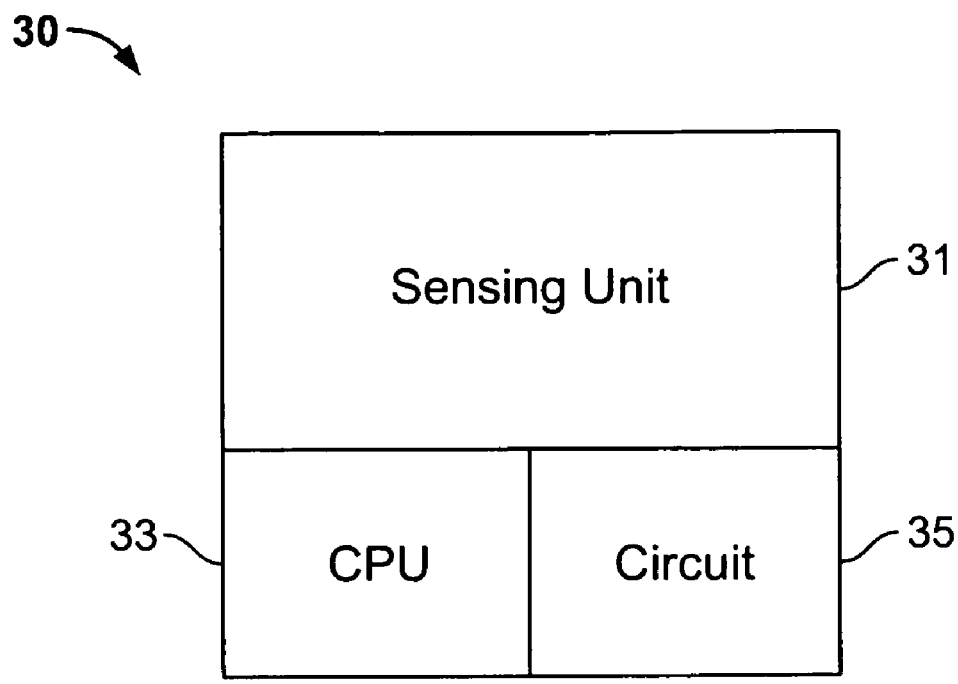
FIG. 3 illustrates a schematic representation of a control unit according to an embodiment of the present invention.

FIG. 3 illustrates a schematic representation of the sensing unit 30. The sensing unit 30 includes a main body 31 housing a processor 33 operatively connected to a sensing circuit 35, which may include the capacitor plate 32.

Referring again to FIG. 2, the capacitor plate 32 is secured to an underside of the flotation member 22. For example, the capacitor plate 32 may be fastened to the flotation member 22, or a plate, sheet or the like that supports the flotation member 22, through adhesives or bonding material. Optionally, the capacitor plate 32 may secure to the flotation member through screws, bolts, or the like.

As shown in FIG. 2, the capacitor plate 32 is approximately the same length and width as the heating element 24. In particular, the capacitor plate 32 may have the same, or larger, perimeter as the heating element 24, such that the length and width dimensions of the capacitor plate 32 are similar, or exactly the same, as that of the heating element 24. Further, the capacitor plate 32 may be positioned directly above, and in alignment with, the heating element 24 so that, in general, the outer boundaries of the heating element 24 do not extend past the outer X-Y plane (relative to the deicing system 10) envelope of the capacitor plate 32. That is, the footprint of the capacitor plate 32 is the same, or roughly the same, as that of the flotation member 22.

Figure 6:
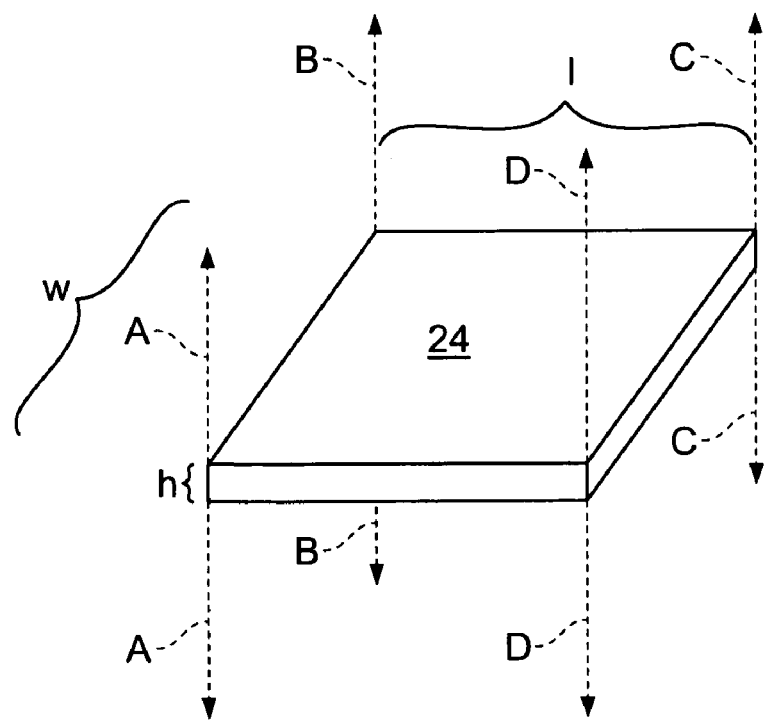
FIG. 6 illustrates a top isometric simplified representation of a heating element, according to an embodiment of the present invention.

FIG. 6 illustrates a top isometric simplified representation of the heating element 24. As shown in FIG. 6, the heating element 24, much like the capacitor plate 32 (shown in FIG. 2), has a length "l", a width "w", and a height "h". The outer length-width envelope of the heating element 24 is defined by plane AB, plane BC, plane CD, and plane DA, which extend through respective sides of the heating element 24.

Referring again to FIG. 2, a post 36 extends from, or through, the capacitor plate 32 and secures the heating element 24 to the capacitor plate 32 and/or the flotation member 22. Various other structures may be used to secure the heating element 24 to the flotation member 22, such as lateral clamps, locks, or the like. The heating element 24 may be secured to a support bracket that also secures to the flotation member 22.

As shown in FIG. 2, a clearance gap 38 is defined between the capacitor plate 32 and the heating element 24. Fluid, such as air or water, may flow through the gap 38 between the capacitor plate 32 and the heating element 24. Alternatively, the heating element 24 may be directly attached to the capacitor plate 32 such that the capacitor plate 32 directly abuts a top or bottom surface of the heating element 24.

Figure 4:
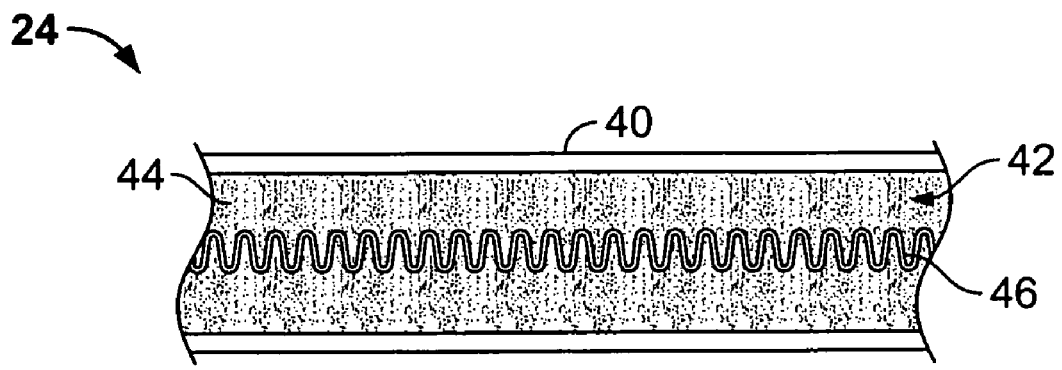
FIG. 4 illustrates a lateral cross-sectional view of a heater coil according to an embodiment of the present invention.

FIG. 4 illustrates a lateral cross-sectional view of the heater coil 24. The heating element 24 includes a metal sheath 40 having a central core 42 that may be packed with Magnesium Oxide (MgO), which may serve as a thermal conductor and electrical insulator. An electrical insulating compound 44 is disposed within the central core 42. Additionally, a heater wire 46 is disposed within a central portion of the electrical insulating compound 44. Instead of using a separate capacitor plate, such as capacitor plate 32 (shown, for example, in FIG. 2), the metal sheath 40 of the heating element 24 may be used as a capacitor.

Referring to FIGS. 1–4, presence of water around the heating element 24 may be detected by measuring capacitance. The capacitance of a plate, or set of plates, is determined through equation (1):

$$C = K\epsilon_0 L \quad (1)$$

where C is the value of capacitance, K is the dielectric constant, $\epsilon_0$ is the permittivity constant with a value of $8.85 \times 10^{-12}$ Farads/meter, and L depends upon the geometry of the capacitor and has dimensions of length. For a parallel plate capacitor, L has the value A/d, where A is the area of each plate and d is the distance between the plates. The dielectric constant K depends upon the material adjacent to the capacitor. For instance, air has a dielectric constant of 1, Pyrex glass has a dielectric constant of 4.5, while polystyrene plastic has a dielectric constant of 2.6. The dielectric constant of water is 78. Thus, the capacitance changes by a factor of 78 for a plate capacitor, depending on whether air or water is the dielectric material. Such change in capacitance provides a determination as to whether water or air is contained in a receptacle on which the capacitor is mounted.

The relationship between capacitance, charge and voltage is given by equation (2), set forth below:

$$q = CV \quad (2)$$

where q is the charge on the capacitor and V is the voltage across the terminals. A change in capacitance is seen as a change in charge for a given voltage when the dielectric material changes.

Figure 5:
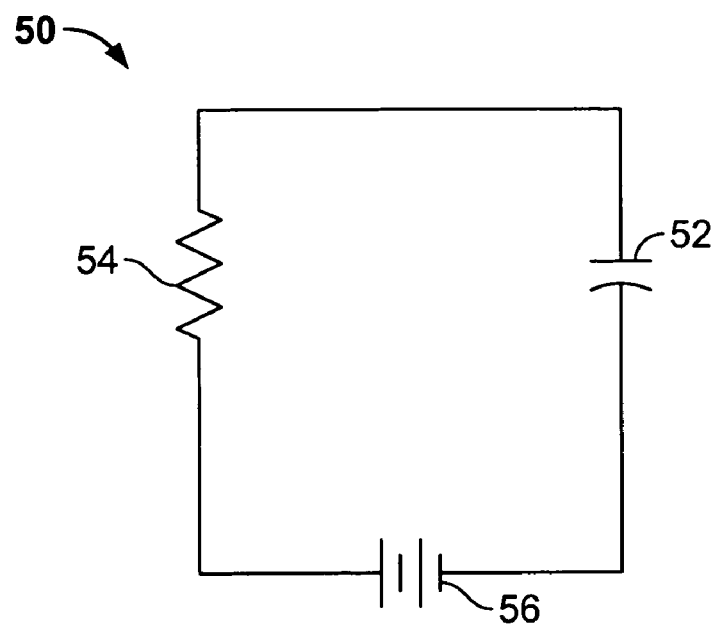
FIG. 5 illustrates a simplified circuit diagram of a level sensing circuit, according to an embodiment of the present invention.

FIG. 5 illustrates a simplified circuit diagram 50 of the sensing unit 30 (shown in FIGS. 1–3), according to an embodiment of the present invention. The circuit diagram 50 is simplified for the sake of clarity. The sensing unit 30 shown in FIG. 3 may include a circuit including the elements shown in FIG. 5. Moreover, the sensing unit 30 may include additional electrical components, such as additional resistors, capacitors, and the like.

In order to observe a change in capacitance, one may connect a capacitor 52, such as the capacitor plate 32 (shown in FIG. 2) or the metal sheath 40 (shown in FIG. 4), in series with a resistor 54 to form an RC circuit. Connecting the circuit to a battery 56 causes current to flow through the resistor 54 and charge the capacitor 52. Instead of the battery 56, the RC circuit may be connected to a source of alternating current, such as provided through a standard wall outlet.

The rate at which the charge on the capacitor 52 increases is given by equation (3):

$$q = CV_0(1 - e^{-1/RC}) \quad (3)$$

where q is once again the charge, $V_0$ is the battery voltage, R is the resistance of the resistor, and C is the capacitance of the capacitor. The value RC is called the time constant of the circuit. Because, V=q/C, the voltage $V_C$ across the capacitor is given by equation (4) set forth below:

$$V_C = V_0(1 - e^{-1/RC}) \quad (4)$$

Thus, the voltage across the capacitor 52 increases exponentially as a function of time. By replacing C in the equation (4) with a higher value, such as would occur with an increase in the dielectric constant, the time constant RC changes accordingly, and the capacitor 52 therefore takes longer to charge. The change in the time constant is directly proportional to the change in capacitance. A detected change in capacitance may be used to deactivate the heating element 24.

The presence of air and water around the heating element 24 may, alternatively, be detected by sensing changes in resistivity. The relationship between voltage, current, and resistance is given by equation (5), which is Ohm's Law:

$$V = IR \quad (5)$$

where V is the voltage, I is the current in amperes, and R is the resistance in ohms. For a resistor, however, the resistance can be expressed in terms of resistivity "p" by equation (6):

$$R = pA/L \quad (6)$$

where A is the cross-sectional area of the resistor, and L is the length of the resistor. The resistivity, in turn, is dependent upon temperature, as given by equation (7):

$$p = p_0[1 + \alpha(T - T_0)] \quad (7)$$

where T is the temperature, $p_0$ is the resistivity at temperature $T_0$, and $\alpha$ is the temperature coefficient of resistivity. For a material such as nickel, the temperature coefficient of resistivity is approximately $6.0 \times 10^{-3} K^{-1}$. Using $T_0 = 298K$ (room temperature) and T=506K (the temperature at which paper ignites) with respect to equation (7), $p = (2.2)p_0$. Thus, the resistivity more than doubles as the resistor is heated to 506K. However, for a resistor that is submerged in water at room temperature, the water absorbs the heat from the resistor, and the resistance is $R = p_0 L/A$. If, however, part of the resistor (e.g., 1/20 of the length) is protruding from the water and allowed to heat up to 506K, the resistance increases, such as by six percent (6%). This change in resistance may be detected and used to deactivate the heating element 24.

Referring to FIGS. 1–5, the sensing unit 30 may be mounted to the exterior of a container, or within a non-metallic container in which the dielectric constant of the capacitor plate 32 is determined by the presence of air or water adjacent to the capacitor plate 32. Optionally, the sensing unit 30 may be separated from the capacitor plate 32 by a non-metallic substance.

As shown in FIG. 2, for example, the capacitor plate 32 is secured to the underside of the flotation member 22. As the water 20 within the fluid receptacle 12 decreases, the deicing unit 10 may come to rest against an obstacle that tips the deicing unit 10 such that part of the heating element 24 is exposed to air. Because the footprint of the capacitor plate 32 is approximately the same as that of the heating element 24, if a portion of the heating element 24 is exposed to air, a corresponding portion of the capacitor plate 32 will also be exposed to air. For example, if an end 60 of the heating element 24 is exposed to air, an end 62 of the capacitor plate 62 will also be exposed to the air. Optionally, if the metal sheath 40 of the heating element 24 is used as the capacitor plate, changes in capacitance are detected in a similar way. As shown in FIG. 4, the metal sheath 40 surrounds the heater wire 46.

Whether the capacitor plate 32 or the metal sheath 46 is used to detect capacitance, the sensing unit 30 receives a capacitance change signal from the capacitor plate 32, thereby sensing a change in capacitance, as discussed above. The processing unit 33 (shown in FIG. 3) may then send a deactivation signal to the heating element 24 based on the sensed change in capacitance, thereby turning the heating element 24 off.

Alternatively, the resistance of the metal sheath 40 of the heating element 24 itself may be measured by the sensing unit 30 to determine if the resistivity of any section of the sheath 40 or the heating element 24 has increased, thereby signaling a hot spot. As discussed above, the resistivity may be determined by measuring the value of resistance with the known value when the deicing system 10 is operating properly. The sensing unit 30 may sense an increase in resistance, and operate to deactivate the heating element 24 in response to the sensed increase in resistance.

Thus, embodiments of the present invention provide a safe and reliable system and method of deactivating a deicing system within a fluid receptacle. Embodiments of the present invention provide a deicing system that automatically deactivates a heater coil based on a detected physical change, such as a change in capacitance or resistivity. Further, embodiments of the present invention do not rely on a thermostat in order to deactivate the heater coil.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. A method of deactivating a heating element of a deicing system positioned within a fluid receptacle, the method comprising:
    positioning a capacitor over the heating element such that no portion of the heating element extends past a length-width envelope of the capacitor;
    detecting a change in capacitance measured by a capacitor; and
    deactivating the heating element based on said detecting step.

2. The method of claim 1, further comprising floating the deicing system on the surface of fluid within the fluid receptacle.

3. The method of claim 1, wherein the change in capacitance is the change in capacitance that results from exposure to water and then air.

4. A deicing system configured to heat fluid within a fluid receptacle to prevent ice from forming, the system comprising:

a flotation member configured to provide buoyancy;

a heating element configured to heat the fluid, said heating element having a first length and a first width defining a first outer perimeter; and a capacitor plate secured to at least one of said flotation member and said heating element, said capacitor plate having a second length and a second width defining a second outer perimeter, wherein said first outer perimeter of said heating element does not extend past a length-width envelope of said second outer perimeter of said capacitor plate.

5. The system of claim 4, further comprising a sensing unit configured to detect a change in at least one of capacitance and resistivity, said sensing unit operating to deactivate said heating element when said sensing unit detects the change in at least one of capacitance and resistivity.

6. The system of claim 5, wherein the change in at least one of capacitance and resistivity is the change in capacitance that results from said capacitor first being exposed to water and then to air.

7. The system of claim 5, wherein the change in at least one of capacitance and resistivity is the change in resistivity that results from at least a portion of said heating element first being exposed to water and then to air.

8. The system of claim 5, wherein said heating element comprises a metal sheath positioned around a heater wire, said sensing unit being in electrical communication with said metal sheath.

* * * * *